United States Patent
Han et al.

(10) Patent No.: US 9,924,334 B1
(45) Date of Patent: Mar. 20, 2018

(54) MESSAGE PUSHING METHOD, TERMINAL EQUIPMENT AND COMPUTER-READABLE STORAGE MEDIUM

(71) Applicant: Beijing Xiaomi Mobile Software Co., Ltd., Haidian District, Beijing (CN)

(72) Inventors: Guangyi Han, Beijing (CN); Yanlu Zhang, Beijing (CN); Enxing Hou, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/591,130

(22) Filed: May 10, 2017

(30) Foreign Application Priority Data

Aug. 30, 2016 (CN) .......................... 2016 1 0772161

(51) Int. Cl.
| | |
|---|---|
| H04W 4/00 | (2009.01) |
| *H04W 4/12* | (2009.01) |
| *H04L 29/08* | (2006.01) |
| H04W 88/02 | (2009.01) |

(52) U.S. Cl.
CPC ............... *H04W 4/12* (2013.01); *H04L 67/26* (2013.01); *H04W 88/02* (2013.01)

(58) Field of Classification Search
CPC ......... H04W 4/12; H04W 4/14; H04W 88/02; H04W 88/023; H04L 67/26; H04L 67/28; H04L 67/2804; H04L 67/2823
USPC ........ 455/410–411, 412.1–414.2, 418–422.1, 455/552.1, 466
See application file for complete search history.

(56) References Cited

U.S. PATENT DOCUMENTS

| | | | | |
|---|---|---|---|---|
| 5,899,975 | A | * 5/1999 | Nielsen | .................. G10L 13/00 704/270.1 |
| 6,035,336 | A | 3/2000 | Lu | |
| 7,400,712 | B2 | * 7/2008 | August | ............ H04M 3/42153 379/88.01 |
| 7,406,169 | B2 | * 7/2008 | Rockett | ................. H04L 67/125 379/265.01 |
| 9,619,202 | B1 | * 4/2017 | Weingartner | ........... G06F 3/167 |
| 2002/0193996 | A1 | * 12/2002 | Squibbs | ............ H04M 1/72544 704/260 |
| 2003/0002643 | A1 | * 1/2003 | Seibel | ................... H04M 3/533 379/201.02 |

(Continued)

FOREIGN PATENT DOCUMENTS

| | | |
|---|---|---|
| CN | 104991894 A | 10/2015 |
| CN | 105187641 A | 12/2015 |

(Continued)

OTHER PUBLICATIONS

International Search Report of PCT Application No. PCT/CN2016/107418, dated May 2, 2017.

(Continued)

*Primary Examiner* — Babar Sarwar
(74) *Attorney, Agent, or Firm* — Jun He Law Offices P.C.; James J. Zhu (57) ABSTRACT

A message pushing method, terminal equipment and a computer-readable storage medium are provided. The method is applied to a mobile terminal, and includes: a plurality of unread pushed messages are acquired; target audio data are generated according to the plurality of unread pushed messages; and the target audio data are output.

12 Claims, 5 Drawing Sheets

(56) References Cited

U.S. PATENT DOCUMENTS

| | | | | |
|---|---|---|---|---|
| 2005/0136955 | A1* | 6/2005 | Mumick | H04L 51/38 |
| | | | | 455/466 |
| 2005/0215260 | A1* | 9/2005 | Ahya | H04W 84/02 |
| | | | | 455/452.2 |
| 2005/0266831 | A1* | 12/2005 | Roth | G10L 19/0018 |
| | | | | 455/412.1 |
| 2006/0189337 | A1 | 8/2006 | Farrill | |
| 2007/0041521 | A1* | 2/2007 | Korah | H04M 1/271 |
| | | | | 379/88.14 |
| 2007/0117549 | A1* | 5/2007 | Arnos | H04M 1/72552 |
| | | | | 455/414.1 |
| 2009/0319273 | A1* | 12/2009 | Mitsui | G06F 17/30053 |
| | | | | 704/260 |
| 2010/0241963 | A1* | 9/2010 | Kulis | G06F 3/167 |
| | | | | 715/727 |
| 2012/0194679 | A1* | 8/2012 | Nehowig | G06F 1/1626 |
| | | | | 348/148 |
| 2012/0303371 | A1* | 11/2012 | Labsky | G10L 13/08 |
| | | | | 704/260 |
| 2013/0179170 | A1* | 7/2013 | Cath | G10L 13/08 |
| | | | | 704/260 |
| 2013/0244633 | A1* | 9/2013 | Jacobs | H04W 68/00 |
| | | | | 455/415 |
| 2013/0316679 | A1* | 11/2013 | Miller | H04M 1/6041 |
| | | | | 455/412.1 |
| 2013/0337853 | A1* | 12/2013 | Korn | H04W 4/12 |
| | | | | 455/466 |
| 2014/0273974 | A1* | 9/2014 | Varghese | H04M 3/42246 |
| | | | | 455/412.1 |
| 2016/0071509 | A1* | 3/2016 | Zhao | G10L 13/04 |
| | | | | 704/260 |
| 2016/0328140 | A1 | 11/2016 | Zhang | |

FOREIGN PATENT DOCUMENTS

| | | |
|---|---|---|
| CN | 105577603 A | 5/2016 |
| WO | 2015180621 A1 | 12/2015 |

OTHER PUBLICATIONS

The Written Opinion of the International Search Authority in international application No. PCT/CN2016/107418, dated May 2, 2017.

Mario Rincon-Nigro et al: " A Text-Driven Conversational Avatar Interface for Instant Messaging on Mobile Devices ", IEEE Transactions on Human-Machine Systems, IEEE, Piscataway, NJ, USA, vol. 43, No. 3, May 1, 2013 (May 1, 2013) .pp. 328-332. XP011500596, ISSN: 2168-2291, DOI:10. 1109 /TSMC. 2013. 2250498.

Supplementary European Search Report in European application No. 17156246.5, dated on Aug. 17, 2017.

* cited by examiner

MESSAGE PUSHING METHOD, TERMINAL EQUIPMENT AND COMPUTER-READABLE STORAGE MEDIUM

CROSS-REFERENCE TO RELATED APPLICATIONS

This application claims priority to Chinese patent application 201610772161.1 filed on Aug. 30, 2016, the entire content of which is incorporated herein by reference.

TECHNICAL FIELD

The present disclosure generally relates to the field of computer technology, and in particular to a message pushing method, terminal equipment and a computer-readable storage medium.

BACKGROUND

With popularity of smart phones, countless information, such as short messages, mails, social information, push notices, etc., are constantly sent to a mobile phone of a user. The user may not see such information timely, or may choose not to view such information for the time being after receiving such information. When the user gets home and is about to view such information, the user generally needs to view the short messages, social software, the mails, etc. one by one, which is time-consuming. Therefore, a method and device for viewing unread information conveniently and rapidly are required.

SUMMARY

According to a first aspect herein, a message pushing method applied to a mobile terminal is provided, and the method includes: acquiring a plurality of unread pushed messages; generating target audio data according to the plurality of unread pushed messages; and outputting the target audio data.

According to a second aspect herein, a terminal equipment is provided, and the terminal equipment includes: a processor; and a memory configured for storing an instruction executable by the processor. The processor is configured for: acquiring a plurality of unread pushed messages; generating target audio data according to the plurality of unread pushed messages; and outputting the target audio data.

According to a third aspect herein, a non-transitory computer-readable storage medium is provided. The non-transitory computer-readable storage medium has stored therein instructions that, when executed by a processor, cause the processor to perform the message pushing method.

Note that the above general description and elaboration below are only exemplary and are not intended to limit the embodiments herein.

BRIEF DESCRIPTION OF THE DRAWINGS

Accompanying drawings herein are incorporated in and constitute a part of this specification, illustrate embodiments consistent with the present disclosure and, together with the description, serve to explain the principles of the present disclosure.

DETAILED DESCRIPTION

Exemplary embodiments will be elaborated below with reference to the accompanying drawings. However, the exemplary embodiments may take on multiple forms, and should not be taken as being limited to examples illustrated herein. Instead, by providing such embodiments, embodiments herein may become more comprehensive and complete, and comprehensive concept of the exemplary embodiments may be delivered to those skilled in the art. The accompanying drawings are but diagrams of embodiments herein, and may not be drawn to scale. Same reference signs in the drawings represent the same or similar parts, so that description of them will not be repeated. Implementations in the following exemplary embodiments do not represent all implementations according to the present disclosure. On the contrary, they are merely examples of equipment and methods according to some aspects of the disclosure as recited in the appended claims.

A term used in an embodiment herein is merely for describing the embodiment instead of limiting the present disclosure. A singular form ""a"" and ""the"" used in an embodiment herein and the appended claims may also be intended to include a plural form, unless clearly indicated otherwise by context. Further note that a term ""and/or"" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a ""if"" as used herein may be interpreted as ""when"" or ""while"" or ""in response to determining that"".

In addition, described characteristics, structures or features may be combined in one or more embodiments in any proper manner. In the following descriptions, many details are provided to allow a full understanding of embodiments herein. However, those skilled in the art will know that the technical solutions of embodiments herein may be carried out without one or more of the details; and alternatively, another method, component, device, step, etc. may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

Figure 1A:
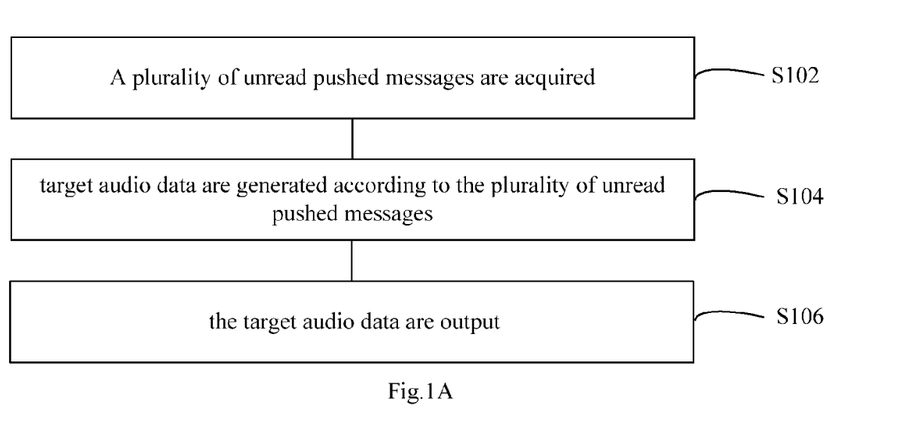
FIG. 1A is a flowchart of a message pushing method according to an exemplary embodiment.
Figure 1B:
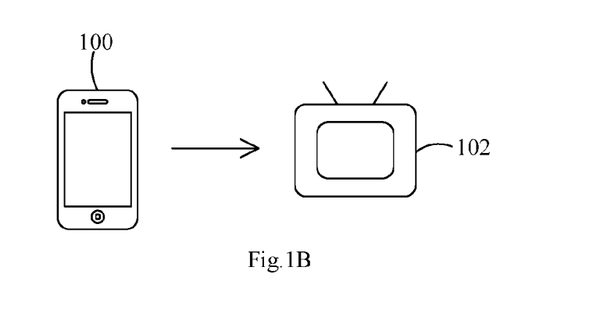
FIG. 1B is a diagram of a system for pushing a message according to an exemplary embodiment.

FIG. 1A is a flowchart of a message pushing method according to an exemplary embodiment, and FIG. 1B is a diagram of a system for pushing a message according to an exemplary embodiment.

As shown in FIG. 1A, the message pushing method may be applied to a mobile terminal. The mobile terminal may include, but is not limited to, a mobile phone, a PAD, etc. The method includes steps S102-S106 as follows.

In step S102, a plurality of unread pushed messages are acquired.

Authorization of each information source may be acquired in advance. Unread information sent by each information source may be collected. When a user is to play the collected unread information, each information source is searched for the unread information.

In step S104, target audio data are generated according to the plurality of unread pushed messages.

The target audio data may be generated according to the collected unread pushed message(s).

In step S106, the target audio data are output.

The generated target audio data may be output such that the user may view the output data. The user may view the unread pushed messages one by one by reading a screen, or listen to the unread information through voice broadcast.

In the embodiment, unread information pushed by multiple different pushing sources may be acquired in a playing mode preset by the user. All unread information may be played at once, such that the user does not have to open various kinds of software to view unread information, which is convenient, quick, and efficient.

The unread pushed message according to an embodiment herein may include, but is not limited to, a short message, a mail, a WeChat message, a pushed notice, etc.

According to an exemplary embodiment, the target audio data may include at least one of content of the unread pushed message, push time when the unread pushed message is pushed, and information of a pushing source having pushed the unread pushed message. For example, if the target audio data include only the "content of the unread pushed message", content of a short message or WeChat message may be played via voice. If the target audio data include a combination of the "push time" and the "pushing source", it may be played via voice that a new message is received by an application of WeChat at 11 o'clock. The user may customize a type of the target audio data in advance, as at least one of the content of the unread pushed message, the push time when the unread pushed message is pushed, and the information of the pushing source having pushed the unread pushed message. In the embodiment, the user is provided with multiple playing choices. If the user does not want to directly listen to content of an unread pushed message, the user may listen to only the push time and the pushing source thereof.

According to an exemplary embodiment, the target audio data may be sent to an intelligent equipment such that the intelligent equipment may play the target audio data. The target audio data may be sent, through a wireless local area network, to the intelligent equipment so as to be displayed or broadcast. For example, as shown in FIG. 1B, target audio data collected in a mobile phone 100 may be sent by the user to an intelligent radio or an intelligent speaker 102 through a wireless local area network, and then be broadcast by the intelligent radio or the intelligent speaker 102 via voice. In another embodiment, the intelligent radio or the intelligent speaker 102 may have a display, and the unread information may be displayed on the display screen.

Figure 2:
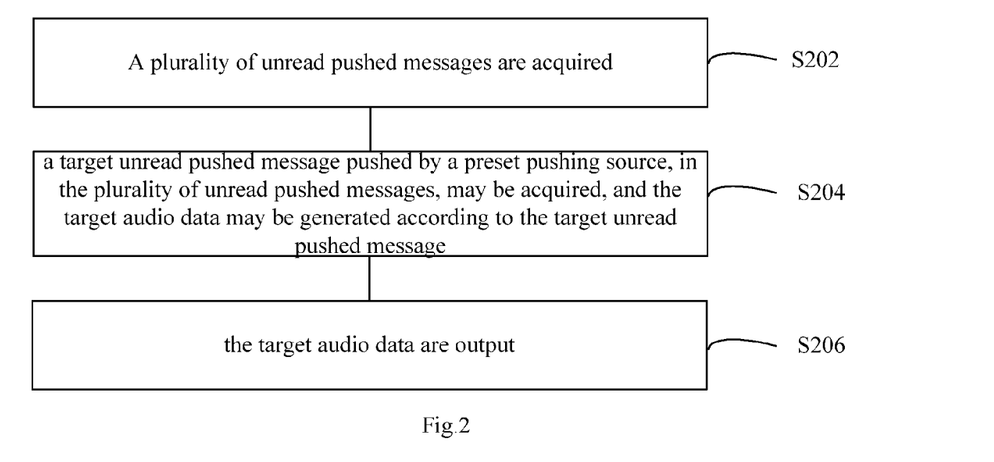
FIG. 2 is a flowchart of a message pushing method according to an exemplary embodiment.

FIG. 2 is a flowchart of a message pushing method according to an exemplary embodiment.

As shown in FIG. 2, the message pushing method may be applied to a mobile terminal. The mobile terminal may include, but is not limited to, a mobile phone, a PAD, etc. The method may include steps S202-S206 as follows.

In step S202, a plurality of unread pushed messages are acquired.

Authorization of each information source may be acquired in advance. Unread information sent by each information source may be collected. When a user is to play the collected unread information, each information source is searched for the unread information.

In step S204, a target unread pushed message pushed by a preset pushing source, in the plurality of unread pushed messages, may be acquired, and a target audio data may be generated according to the target unread pushed message.

The user may preset one or more pushing sources from which the unread messages are acquired. For example, if the user wishes to know only an unread message of WeChat or QQ among various applications, it may be preset that only an unread message of WeChat or QQ is pushed. After the target unread pushed messages corresponding to the one or more pushing sources preset by the user are acquired, the target audio data to be pushed may be generated.

In step S206, the target audio data are output.

The generated target audio data may be output such that the user may view the output data. The user may view the unread pushed messages one by one by reading a screen, or listen to the unread information through voice broadcast.

In the embodiment, the user may preset an information source, and customize content of information to be pushed, thereby screening out unwanted information, further improving efficiency in information pushing, and flexibility.

Figure 3:
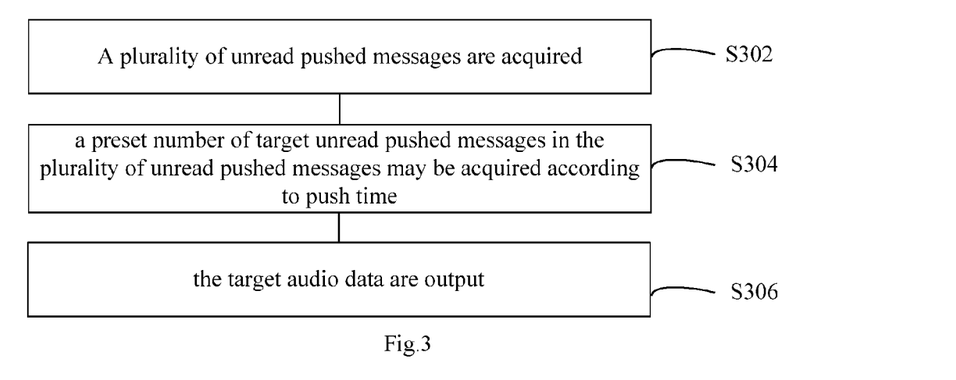
FIG. 3 is a flowchart of a message pushing method according to an exemplary embodiment.

FIG. 3 is a flowchart of a message pushing method according to an exemplary embodiment.

As shown in FIG. 3, the message pushing method may be applied to a mobile terminal. The mobile terminal may include, but is not limited to, a mobile phone, a PAD, etc. The method may include steps S302-S306 as follows.

In step S302, a plurality of unread pushed message are acquired.

Authorization of each information source may be acquired in advance. Unread information sent by each information source may be collected. When a user is to play the collected unread information, each information source is searched for the unread information.

In step S304, a preset number of target unread pushed messages in the plurality of unread pushed messages may be acquired according to push time.

The user may preset that a preset number of target unread pushed messages may be acquired according to push time. For example, if the user only wants to know first 10 target unread pushed messages, it may be preset that only first 10 messages are acquired according to the push time. According to the presetting of the user, target audio data to be pushed may be generated by using the first 10 target unread pushed messages.

In step S306, the target audio data are output.

The generated target audio data may be output such that the user may view the output data. The user may view the unread pushed messages one by one by reading a screen, or listen to the unread information through voice broadcast.

In the embodiment, the user may preset an amount of information to be pushed and perform customization, thereby improving efficiency in information pushing, and enabling flexible usage.

Figure 4:
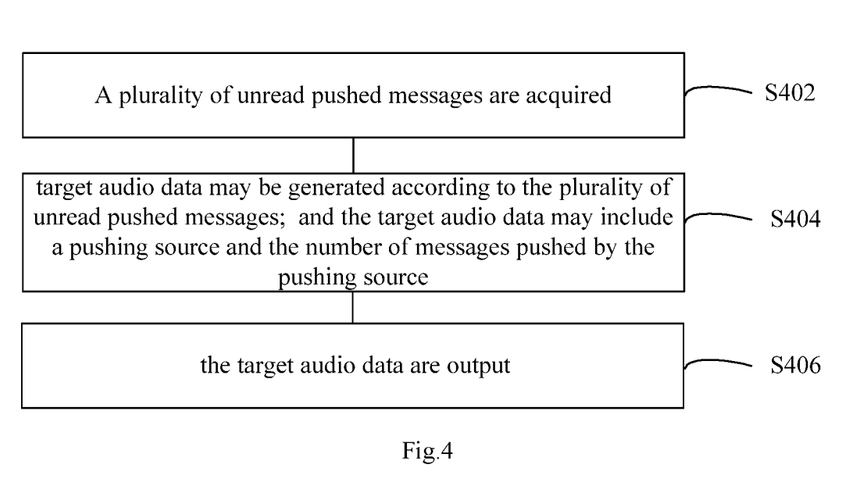
FIG. 4 is a flowchart of a message pushing method according to an exemplary embodiment.

FIG. 4 is a flowchart of a message pushing method according to an exemplary embodiment.

As shown in FIG. 4, the message pushing method may be applied to a mobile terminal. The mobile terminal may include, but is not limited to, a mobile phone, a PAD, etc. The method may include steps S402-S406 as follows.

In step S402, a plurality of unread pushed message are acquired.

Authorization of each information source may be acquired in advance. Unread information sent by each information source may be collected. When a user is to play the collected unread information, each information source is searched for the unread information.

In step S404, target audio data may be generated according to the plurality of unread pushed message, and the target audio data may include a pushing source and a number of messages pushed by the pushing source.

The user may preset a number of messages pushed by a pushing source. For example, it may be set that a WeChat application may push 10 messages and QQ may push 5 messages. Pushing sources corresponding to the plurality of unread pushed messages respectively may be determined according to the presetting of the user. A number of messages pushed by each of the pushing sources may be counted. The target audio data may be generated according to the number of messages pushed by each of the pushing sources. For example, 12 unread WeChat messages, 3 unread microblog messages, etc. may be played via voice.

In step S406, the target audio data are output.

The generated target audio data may be output such that the user may view the output data. The user may view the unread pushed messages one by one by reading a screen, or listen to the unread information through voice broadcast.

In the embodiment, the user may preset amounts of information pushed by different pushing sources and perform customization, thereby improving efficiency in information pushing, and flexibility.

Corresponding to the aforementioned message pushing method according to above embodiments, an embodiment herein further provides a message pushing device.

Figure 5A:
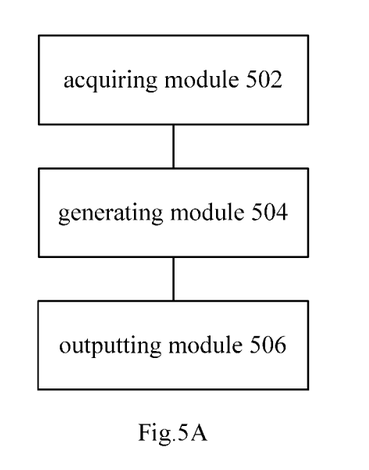
FIG. 5A is a diagram of a message pushing device according to an exemplary embodiment.
Figure 5B:
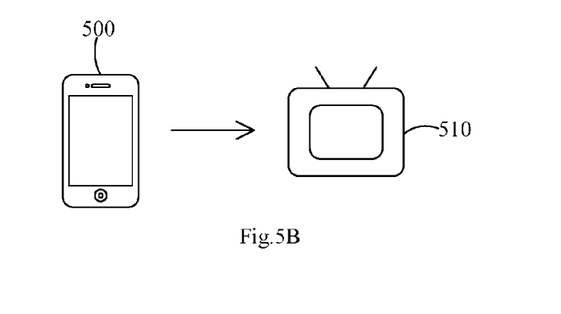
FIG. 5B is a diagram of a system for pushing a message according to an exemplary embodiment.
Figure 5C:
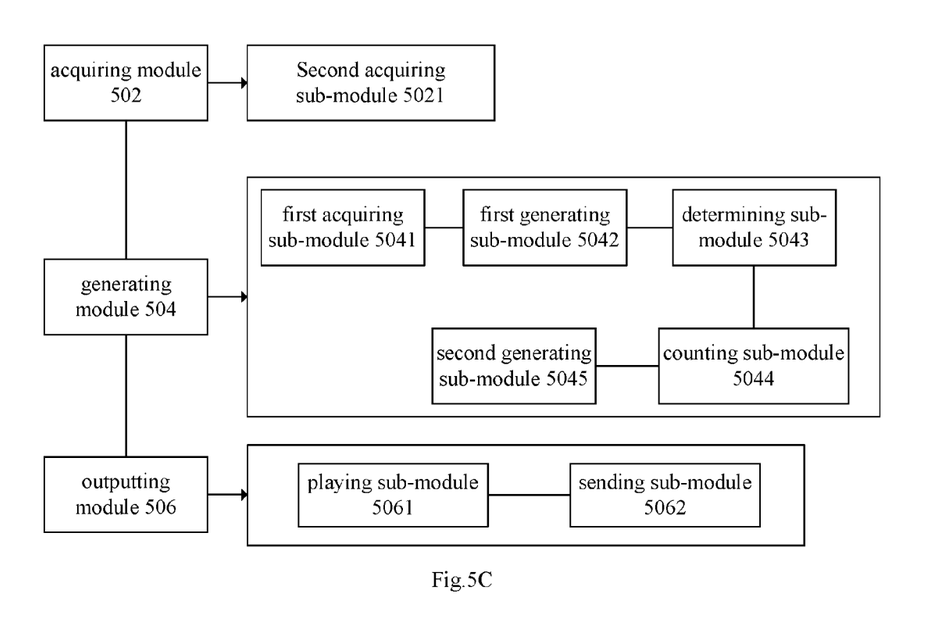
FIG. 5C is a diagram of a message pushing device according to an exemplary embodiment.

FIG. 5A is a diagram of a message pushing device according to an exemplary embodiment. FIG. 5B is a diagram of a system for pushing a message according to an exemplary embodiment. FIG. 5C is a diagram of a message pushing device according to an exemplary embodiment.

As shown in FIG. 5A, the message pushing device may be applied to a mobile terminal. The mobile terminal may include, but is not limited to, a mobile phone, a PAD, etc. The device includes an acquiring module 502, a generating module 504, and an outputting module 506.

The acquiring module 502 is configured for: acquiring a plurality of unread pushed messages.

Authorization of each information source may be acquired in advance. The acquiring module 502 may collect unread information sent by each information source. When a user is to play the collected unread information, each information source is searched for the unread information.

The generating module 504 is configured for: generating target audio data according to the plurality of unread pushed messages.

The generating module 504 may generate the target audio data according to the collected unread pushed message(s).

The outputting module 506 is configured for: outputting the target audio data.

The outputting module 506 may output the generated target audio data such that the user may view the output data. The user may view the unread pushed messages one by one by reading a screen, or listen to the unread information through voice broadcast.

In the embodiment, by acquiring authorization in advance, unread information pushed by multiple different information sources may be acquired. All unread information may be played at once, such that the user does not have to open various kinds of software to view unread information, which is convenient, quick, and efficient.

The unread pushed message according to an embodiment herein may include, but is not limited to, a short message, a mail, a WeChat message, a pushed notice, etc.

According to an exemplary embodiment, as shown in FIG. 5C, the outputting module 506 may include a playing sub-module 5061 and a sending sub-module 5062. The playing sub-module 5061 may be configured for: playing the target audio data. The sending sub-module 5062 may be configured for: sending the target audio data to an intelligent equipment such that the intelligent equipment plays the target audio data. The target audio data may be played by the playing sub-module 5061. Alternatively, the target audio data may be sent, by the sending sub-module 5062 through a wireless local area network, to an intelligent equipment so as to be displayed or broadcast by the intelligent equipment. For example, as shown in FIG. 5B and FIG. 5C, target audio data collected in a mobile phone 500 may be sent by the user, via the sending sub-module 5062, to an intelligent radio or an intelligent speaker 510 through a wireless local area network, and then be broadcast by the intelligent radio or the intelligent speaker 510 via voice. In another embodiment, the intelligent radio or the intelligent speaker 510 may have a display, and the unread information may be displayed on the display screen.

According to an exemplary embodiment, as shown in FIG. 5C, the generating module 504 may include a first acquiring sub-module 5041 and a first generating sub-module 5042. The first acquiring sub-module 5041 may be configured for: acquiring, in the unread pushed messages, a target unread pushed message pushed by a preset pushing source. The first generating sub-module 5042 may be configured for: generating the target audio data according to the target unread pushed message. As shown in FIG. 5C, the first acquiring sub-module 5041 may acquire, in the unread pushed messages, a target unread pushed message pushed by a preset pushing source; and the first generating sub-module 5042 may generate the target audio data according to the target unread pushed message. The user may preset one or more pushing sources from which the unread messages are acquired. For example, if the user wishes to know only an unread message of WeChat or QQ among various applications, it may be preset that only an unread message of WeChat or QQ is pushed. After the first acquiring sub-module 5041 acquires the target unread pushed messages corresponding to the one or more pushing sources preset by the user, the first generating sub-module 5042 may generate the target audio data to be pushed. In the embodiment, the user may preset an information source a message sent by which is to be pushed, and customize content of information to be pushed, thereby screening out unwanted information, further improving efficiency in information pushing, and flexibility.

According to an exemplary embodiment, as shown in FIG. 5C, the acquiring module 502 may include a second acquiring sub-module 5021. The second acquiring submodule 5021 may be configured for: acquiring, in the unread pushed messages, a preset number of target unread pushed messages according to push time. As shown in FIG. 5C, the second acquiring sub-module 5021 may acquire, in the unread pushed messages, a preset number of target unread pushed messages according to push time. The user may preset that a preset number of target unread pushed messages may be acquired according to push time. For example, if the user only wants to know first 10 target unread pushed messages, it may be preset that only first 10 messages are acquired according to the push time. According to the presetting of the user, target audio data to be pushed may be generated by using the first 10 target unread pushed messages. In the embodiment, the user may preset an amount of information to be pushed and perform customization, thereby improving efficiency in information pushing, and flexibility.

According to an exemplary embodiment, the target audio data generated by the generating module 504 may include at least one of content of the unread pushed message, push time when the unread pushed message is pushed, and information of a pushing source having pushed the unread pushed message. For example, if the target audio data include only the "content of the unread pushed message", content of a short message or WeChat message may be played via voice. If the target audio data include a combination of the "push time" and the "pushing source", it may be played via voice that a new message is received by an application of WeChat at 11 o'clock. The user may customize a type of the target audio data in advance, as at least one of the content of the unread pushed message, the push time when the unread pushed message is pushed, and the information of the pushing source having pushed the unread pushed message. In the embodiment, the user is provided with multiple playing choices. In case the user does not want to directly listen to content of an unread pushed message, the user may listen to only the push time and the pushing source thereof.

According to an exemplary embodiment, the target audio data generated by the generating module 504 may include a pushing source and a number of messages pushed by the pushing source. As shown in FIG. 5C, the generating module 504 may further include a determining sub-module 5043, a counting sub-module 5044, and a second generating sub-module 5045. The determining sub-module 5043 may be configured for: determining pushing sources corresponding respectively to the unread pushed messages. The counting sub-module 5044 may be configured for: counting a number of messages pushed by each of the pushing sources. The second generating sub-module 5045 may be configured for: generating the target audio data according to the number of messages pushed by each of the pushing sources. As shown in FIG. 5C, the user may preset a number of messages pushed by a pushing source. For example, it may be set that a WeChat application may push 10 messages and QQ may push 5 messages. The determining sub-module 5043 may determine pushing sources corresponding respectively to the plurality of unread pushed messages according to the presetting of the user. The counting sub-module 5044 may count a number of messages pushed by each of the pushing sources. The second generating sub-module 5045 may generate the target audio data according to the number of messages pushed by each of the pushing sources. For example, 12 unread WeChat messages, 3 unread microblog messages, etc. may be played via voice. In the embodiment, the user may preset amounts of information pushed by different pushing sources and perform customization, thereby improving efficiency in information pushing, and flexibility.

The way in which a module of the device in an aforementioned embodiment executes an operation has been elaborated in an aforementioned embodiment of the method, and will not be elaborated here.

Correspondingly, an embodiment herein may further provide terminal equipment including: a processor; and a memory configured for storing an instruction executable by the processor.

The processor is configured for: acquiring a plurality of unread pushed messages; generating target audio data according to the plurality of unread pushed messages; and outputting the target audio data.

Figure 6:
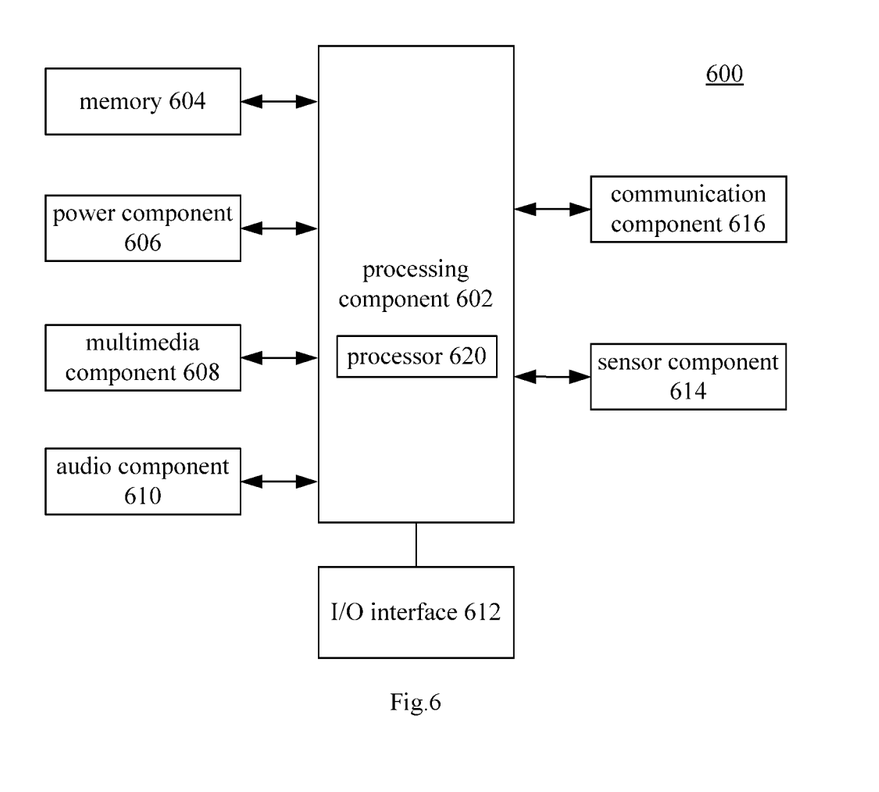
FIG. 6 is a diagram of terminal equipment according to an exemplary embodiment.

FIG. 6 is a diagram of terminal equipment according to an exemplary embodiment.

As shown in FIG. 6, the terminal equipment 600 may be a mobile phone, a computer, a digital broadcasting terminal, a message transceiver, tablet equipment, a Personal Digital Assistant, etc.

The terminal equipment 600 may include one or more components as follows: a processing component 602, a memory 604, a power component 606, a multimedia component 608, an audio component 610, an Input/Output (I/O) interface 612, a sensor component 614, and a communication component 616.

The processing component 602 generally controls an overall operation of the terminal equipment 600, such as operations associated with display, a telephone call, data communication, a camera operation, and a recording operation. The processing component 602 may include one or more processors 620 to execute instructions so as to complete all or some steps of the method. In addition, the processing component 602 may include one or more modules to facilitate interaction between the processing component 602 and other components. For example, the processing component 602 may include a multimedia module to facilitate interaction between the multimedia component 608 and the processing component 602.

The memory 604 may be configured for storing various types of data to support the operation on the terminal equipment 600. Example of such data may include instructions of any application or method configured for operating on the terminal equipment 600, contact data, phonebook data, messages, pictures, videos, etc. The memory 604 may be realized by any type of volatile/transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 606 may supply electric power to various components of the terminal equipment 600. The power component 606 may include a power management system, one or more power sources, and other components related to generating, managing and distributing electricity for the terminal equipment 600.

The multimedia component 608 may include a screen providing an output interface between the terminal equipment 600 and a user. In some embodiments, the screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. In some embodiments, the multimedia component 608 may include a front camera and/or a rear camera. When the terminal equipment 600 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 610 may be configured for outputting and/or inputting an audio signal. For example, the audio component 610 may include a microphone (MIC). When the terminal equipment 600 is in an operation mode such as a call mode, a recording mode, and a voice recognition mode, the MIC may be configured for receiving an external audio signal. The received audio signal may be further stored in the memory 604 or may be sent via the communication component 616. In some embodiments, the audio component 610 may further include a loudspeaker configured for outputting the audio signal.

The I/O interface 612 may provide an interface between the processing component 602 and a peripheral interface module. Such a peripheral interface module may be a keypad, a click wheel, a button or the like. Such a button may include but is not limited to: a homepage button, a volume button, a start button, and a lock button.

The sensor component 614 may include one or more sensors for assessing various states of the terminal equipment 600. For example, the sensor component 614 may detect an on/off state of the terminal equipment 600 and relative positioning of components such as the display and the keypad of the terminal equipment 600. The sensor component 614 may further detect a change in the position of the terminal equipment 600 or of a component of the terminal equipment 600, whether there is contact between the terminal equipment 600 and a user, the orientation or acceleration/deceleration of the terminal equipment 600, and a change in the temperature of the terminal equipment 600. The sensor component 614 may include a proximity sensor configured for detecting existence of a nearby object without physical contact. The sensor component 614 may further include an optical sensor such as a Complementary Metal-Oxide-Semiconductor (CMOS) or Charge-Coupled-Device (CCD) image sensor used in an imaging application. In some embodiments, the sensor component 614 may further include an acceleration sensor, a gyroscope sensor, a magnetic sensor, a pressure sensor, or a temperature sensor.

The communication component 616 may be configured for facilitating wired or wireless communication between the terminal equipment 600 and other equipment. The terminal equipment 600 may access a wireless network based on a communication standard such as Wi-Fi, 2G, 3G, 4G, or a combination thereof. In an exemplary embodiment, the communication component 616 may receive a broadcast signal or broadcast related information from an external broadcast management system via a broadcast channel. In an exemplary embodiment, the communication component 616 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and other technologies.

In an exemplary embodiment, the terminal equipment 600 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components to implement the method.

In an exemplary embodiment, a non-transitory computer-readable storage medium including instructions, such as a memory 604 including instructions, may be provided. The instructions may be executed by the processor 620 of the terminal equipment 600 to implement the method. For example, the non-transitory computer-readable storage medium may be a Read-Only Memory (ROM), a Compact Disc Read-Only Memory (CD-ROM), a magnetic tape, a floppy disk, optical data storage equipment, etc.

Other embodiments herein will be apparent to those skilled in the art from consideration of the specification and practice of the invention disclosed here. This application is intended to cover any variations, uses, or adaptations of the disclosure following the general principles thereof and including such departures from Embodiments herein as come within known or customary practice in the art. The specification and the embodiments are intended to be exemplary only, with a true scope and spirit of the disclosure being indicated by the appended claims.

Note that Embodiments herein is not limited to the exact construction that has been described above and illustrated in the accompanying drawings, and that various modifications and changes can be made without departing from the scope thereof. It is intended that the scope of Embodiments herein be limited only by the appended claims.

INDUSTRIAL APPLICABILITY

With a message pushing method and device, and terminal equipment according to embodiments herein, unread information pushed by multiple different pushing sources may be acquired in a playing mode preset by the user; and all unread information may be played at once, such that the user does not have to open various kinds of software to view unread information, which is convenient, quick, and efficient.

What is claimed is:
1. A message pushing method, applied to a mobile terminal, the method comprising:
obtaining at least one preset pushing source preset by a user;
obtaining a type of a target audio data customized by a user;
acquiring authorizations of each pushing source;
acquiring a plurality of unread pushed messages;
generating the target audio data according to the plurality of unread pushed messages; and
outputting the target audio data;
wherein the generating the target audio data according to the plurality of unread pushed messages comprises:
acquiring, in the plurality of unread pushed messages, a target unread pushed message pushed by the at least one preset pushing source;
counting a number of the target pushed messages pushed by each preset pushing source; and
generating the target audio data according to the number of the target pushed messages pushed by each preset pushing source;
wherein the target audio data comprises each preset pushing source and the number of the target pushed messages pushed by each preset pushing source;

wherein the target audio data further comprises at least one of a message content and a push time of the target unread pushed message.

2. The method according to claim 1, wherein outputting the target audio data comprises:
playing the target audio data.

3. The method according to claim 1, wherein outputting the target audio data comprises:
sending the target audio data to an intelligent equipment for playing the target audio data.

4. The method according to claim 1, wherein acquiring the plurality of unread pushed messages comprises:
acquiring, in the plurality of unread pushed messages, a preset number of target unread pushed messages according to the push time.

5. Terminal equipment, comprising:
a processor; and
a memory configured for storing an instruction executable by the processor,
wherein the processor is configured for:
obtaining at least one preset pushing source preset by a user;
obtaining a type of a target audio data customized by a user;
acquiring authorizations of each pushing source;
acquiring a plurality of unread pushed messages;
generating the target audio data according to the plurality of unread pushed messages; and
outputting the target audio data;
wherein the generating the target audio data according to the plurality of unread pushed messages comprises:
acquiring, in the plurality of unread pushed messages, a target unread pushed message pushed by the at least one preset pushing source;
counting a number of the target pushed messages pushed by each preset pushing source; and
generating the target audio data according to the number of the target pushed messages pushed by each preset pushing source;
wherein the target audio data comprises each preset pushing source and the number of the target pushed messages pushed by each preset pushing source;
wherein the target audio data further comprises at least one of a message content and a push time of the target unread pushed message.

6. The terminal equipment according to claim 5, wherein outputting the target audio data comprises:
playing the target audio data.

7. The terminal equipment according to claim 5, wherein outputting the target audio data comprises:
sending the target audio data to an intelligent equipment for playing the target audio data.

8. The terminal equipment according to claim 5, wherein acquiring the plurality of unread pushed messages comprises:
acquiring, in the plurality of unread pushed messages, a preset number of target unread pushed messages according to the push time.

9. A non-transitory computer-readable storage medium having stored therein instructions that, when executed by a processor, cause the processor to perform a message pushing method, wherein the method is applied to a mobile terminal and comprises:
obtaining at least one preset pushing source preset by a user;
obtaining a type of a target audio data customized by a user;
acquiring authorizations of each pushing source;
acquiring a plurality of unread pushed messages;
generating the target audio data according to the plurality of unread pushed messages; and
outputting the target audio data;
wherein the generating the target audio data according to the plurality of unread pushed messages comprises:
acquiring, in the plurality of unread pushed messages, a target unread pushed message pushed by the at least one preset pushing source;
counting a number of the target pushed messages pushed by each preset pushing source; and
generating the target audio data according to the number of the target pushed messages pushed by each preset pushing source;
wherein the target audio data comprises each preset pushing source and the number of the target pushed messages pushed by each preset pushing source;
wherein the target audio data further comprises at least one of a message content and a push time of the target unread pushed message.

10. The storage medium according to claim 9, wherein outputting the target audio data comprises:
playing the target audio data.

11. The storage medium according to claim 9, wherein outputting the target audio data comprises:
sending the target audio data to an intelligent equipment for playing the target audio data.

12. The storage medium according to claim 9, wherein acquiring the plurality of unread pushed messages comprises:
acquiring, in the plurality of unread pushed messages, a preset number of target unread pushed messages according to the push time.

* * * * *